United States Patent
Tornquist et al.

(10) Patent No.: US 6,849,987 B2
(45) Date of Patent: Feb. 1, 2005

(54) SYSTEM AND METHOD FOR END TURN RETENTION ON A HIGH SPEED GENERATOR ROTOR

(75) Inventors: Gerald E. Tornquist, Tuscon, AZ (US); Gregor J. S. McDowall, Tucson, AZ (US); Mingzhou Xu, Tucson, AZ (US); Kieran P. J. Doherty, Tucson, AZ (US); Jim Lengel, Oro Valley, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/754,339

(22) Filed: Jan. 9, 2004

(65) Prior Publication Data

US 2004/0140727 A1 Jul. 22, 2004

Related U.S. Application Data

(62) Division of application No. 09/943,201, filed on Aug. 30, 2001, now Pat. No. 6,727,634.

(51) Int. Cl.⁷ ............................................... H02K 3/46
(52) U.S. Cl. ..................................... 310/270; 310/260
(58) Field of Search ................................ 310/270, 260, 310/59, 216, 218

(56) References Cited

U.S. PATENT DOCUMENTS

| 5,177,390 A | * | 1/1993 | Van Maaren | 310/183 |
| 5,666,016 A | * | 9/1997 | Cooper | 310/270 |
| 5,780,951 A | * | 7/1998 | Stephens | 310/172 |
| 6,727,634 B2 | * | 4/2004 | Tornquist et al. | 310/270 |

* cited by examiner

Primary Examiner—Dang Le
Assistant Examiner—Nguyen N Hanh
(74) Attorney, Agent, or Firm—Douglas A. Mullen, Esq.

(57) ABSTRACT

A new improved system and method for end turn retention for wires on a generator rotor for use in high speed applications such as in aircraft applications. The rotor includes a shaft, spokes, supports, and wire winding coils, and at least one cap device. The spokes extend radially outwardly from the shaft, and each support is positioned on an associated spoke. Each coil wraps around an associated support and spoke. Each cap device is coupled to an end of its associated spoke to prevent the windings from moving radially outwardly while the rotor spins. Each support is coupled to an associated cap device, and includes at its radially inward edge a flange protruding away from the respective spoke. Because of the flange and the cap device, slack of the wire coil between the flange and the associated cap is taken up.

3 Claims, 7 Drawing Sheets

SYSTEM AND METHOD FOR END TURN RETENTION ON A HIGH SPEED GENERATOR ROTOR

This application is a divisional of Ser. No. 09/943,201 filed on Aug. 30, 2001, now U.S. Pat. No. 6,727,634.

FIELD OF THE INVENTION

The present invention relates to high speed generators and, more particularly, to systems and methods for fastening wire coils to the rotors of such generators.

BACKGROUND OF THE INVENTION

Generator systems that are installed in aircraft may include three separate brushless generators, namely, a permanent magnet generator (PMG), an exciter, and a main generator. The PMG includes permanent magnets on its rotor. When the PMG rotates, AC currents are induced in stator windings of the PMG. These AC currents are typically fed to a regulator or a control device, which in turn outputs a DC current. This DC current next is provided to stator windings of the exciter. As the rotor of the exciter rotates, three phases of AC current are typically induced in the rotor windings. Rectifier circuits that rotate with the rotor of the exciter rectify this three-phase AC current, and the resulting DC currents are provided to the rotor windings of the main generator. Finally, as the rotor of the main generator rotates, three phases of AC current are typically induced in its stator windings, and this three-phase AC output can then be provided to a load such as, for example, electrical aircraft systems.

Because the generators installed in aircraft will often be variable frequency generators that rotate in the speed range of 12,000 rpm to 24,000 rpm, large centrifugal forces are imposed upon the rotors of the generators. Given these stressful operating conditions, the rotors of the generators should be carefully designed and manufactured, both so that the rotors are reliable and also so that the rotors are precisely balanced. Improper balancing in particular can result not only in inefficiencies in the operation of the generators, but also in a risk of failure of the generators.

Among the important components in rotors that should be carefully designed and manufactured in order to guarantee robustness and proper balancing of the rotors are the wire coils of the rotors. The centrifugal forces experienced by the rotors are sufficiently strong as to cause bending of the wires of these coils, which over time can result in mechanical breakdown of the wires. Additionally, because the coils are assemblies of individual wires that can move to some extent with respect to one another and with respect to the remaining portions of the rotors, the coils constitute one of the significant potential sources of imbalance within the rotors. The stresses and movement experienced by the wire coils are particularly problematic at the end turns of the coils, at which wires loop from first directions to second directions on the poles supporting the wires.

In order to guarantee robust wire coils and to minimize the amount of imbalance in the rotors that occurs due to the wire coils, the process of initially wrapping the wires of the coils onto the rotors is typically a time-intensive, expensive task. To keep the wrapped coils to within specified tolerances, complicated tooling equipment and an involved process of utilizing shims to guarantee sufficient internal pressure among the wires of the coil are required. Often, the wrapping process involves a significant amount of trial and error before all of the multiple coils on a multi-pole generator are properly configured to have the desired balancing and other characteristics. The difficulty of the wrapping process is greatest at the end turns of the coil wires.

Hence, there is a need for a new system and method for supporting and retaining the wire coils in rotors, particularly at the end turns of the coils. There further is a need for a system and method for end turn retention in which the coil wires at the end turns are positioned accurately and held reliably in position. There additionally is a need for such a system and method whereby the wrapping process is made simpler, more accurate and repetitive, and more cost-effective.

SUMMARY OF THE INVENTION

The present inventors have recognized that end turn supports employed on rotors can be designed to include flanges that provide support to the end turns to limit movement of the wires radially inward. By coupling these supports to end cap hats that limit movement of the wires radially outward, pressure is generated upon the wires in between the flanges and the end cap hats causing the wires to become packed and thereby more robust. At the same time, the coupling of the supports to the end cap hats forces the wires into precise desired locations, thereby improving rotor balance and robustness and simplifying the wrapping process.

In particular, the present invention relates to a rotor for use in a high speed generator, where the rotor includes a shaft extending axially through the rotor, a plurality of spokes extending radially from a location along the shaft and a plurality of supports, where each one of the supports is positioned proximate a respective one of the spokes. The rotor further includes a plurality of coils of wire windings, each wrapped around a respective one of the supports and a respective one of the spokes, and at least one cap device coupled to ends of the spokes away from the shaft. The at least one cap device prevents the wire windings of the coils from moving outward away from the shaft beyond outer radial limits. Each support is coupled to the at least one cap device, and each support extends radially inward along its respective spoke from the at least one cap device to at least a respective inner limit. Each support includes at its respective inner limit a respective flange protruding away from the respective spoke, and each flange prevents the wire windings of the respective coil from moving beyond the respective inner limit towards the shaft.

The present invention further relates to a support for implementation on a spoke extending outward radially from a shaft of a rotor. The support includes a U-shaped main portion having an outer face and an inner face, where the support is configured so that the inner face of the support is in physical contact with the spoke when the support is supported thereby, and where the support is further configured to support a wire coil that is wrapped around the support along the outer face. The support further includes first and second sides of the U-shaped main portion that are substantially transverse with respect to the outer and inner faces and also with respect to a channel along the inner face through the U-shaped main portion, the channel being configured to receive the spoke. The support additionally includes a flange proximate the first side of the U-shaped main portion and extending outward away from the channel beyond the outer face. The support is configured to be positioned on the spoke so that the first side is closer to the shaft than the second side, and is additionally configured to allow for coupling of the support to a cap hat.

The present invention additionally relates to a generator including a stator and a rotor that is rotatably coupled within the stator. The rotor includes a shaft extending axially through the rotor, a plurality of appendages extending radially outward from the shaft, and a plurality of wire coils that are supported away from the shaft by the plurality of appendages. The rotor further includes a first means for preventing outward radial movement of wires of the wire coils beyond respective outer limits, and a second means for preventing inward radial movement of wires of the wire coils beyond respective inner limits. At least one of the first means and second means is secured to the plurality of appendages and, when only one of the first means and second means is secured to the plurality of appendages, the remaining other means is further secured to that one of the first and second means that is secured to the appendages.

The present invention further relates to an end cap device for implementation in a rotor including an appendage extending outward radially from a shaft of the rotor and further including a support positioned on the appendage, wherein the support is capable of supporting end turns of a wire coil of the rotor and includes a flange at an inner radial position that limits movement of the end turns radially inward toward the shaft. The end cap device includes a physical barrier, a first fastening element by which the end cap device is coupled to the appendage, and a second fastening element by which the end cap device is coupled to the support.

The present invention additionally relates to a method of retaining wires of a coil within a desired radial region relative to a shaft of a rotor. The method includes positioning at least one of a support and an additional element on a first appendage extending radially from the shaft, where the at least one support and additional element includes a flange. The method additionally includes wrapping the wires of the coil onto the support, and providing a cap hat proximate an outer end of the first appendage away from the shaft. The method further includes attaching at least one of the cap hat and the support to the first appendage and, if only one of the cap hat and the support is attached to the first appendage, further attaching the cap hat and the support to one another. The flange extends away from the first appendage and prevents movement of the wires of the coil toward the shaft beyond an inner limit, and the cap hat prevents movement of the wires away from the shaft beyond an outer limit.

Other features and advantages of the high speed generator will become apparent from the following detailed description, taken in conjunction with the accompanying drawings, which illustrate, by way of example, the principles of the invention.

DETAILED DESCRIPTION OF THE INVENTION

Figure 1:
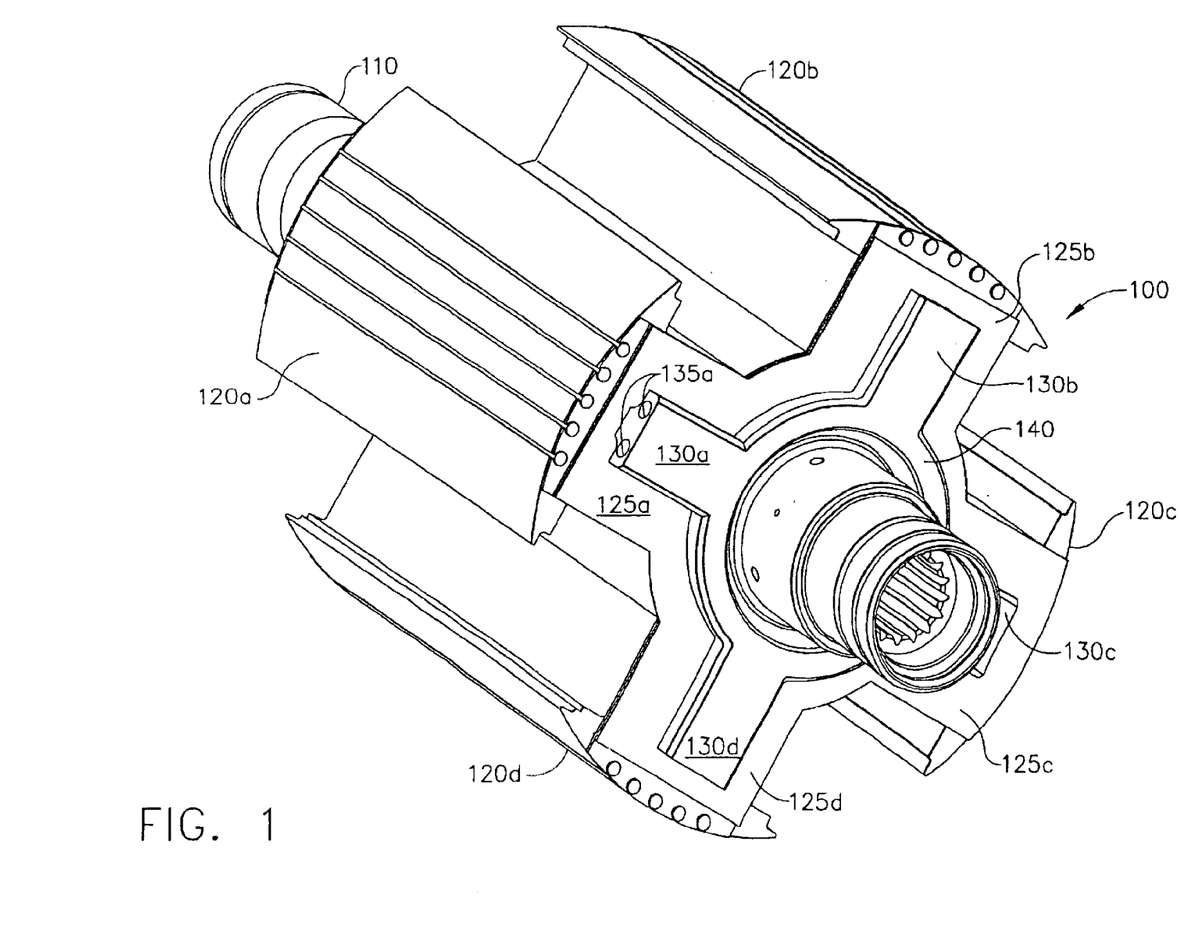
FIG. 1 is a perspective view of several components of an exemplary rotor, on which can be employed the present invention.

Referring to FIG. 1, components of an exemplary rotor 100 on which the present invention can be employed include a shaft 110 extending axially through the rotor, four poles 120a–d that extend radially away from the shaft 110, and four spokes 130a–d that extend radially away from the shaft 110 at a hub location 140. The spokes 130a–d are radially aligned with, and coupled to, end faces 125a–d of the poles 120a–d, respectively. As discussed further below, each of the spokes 130a–d respectively includes one or more threaded holes 135a–d (only holes 135a are shown in FIG. 1). The rotor 100 presently shown is designed for implementation in high speed generators such as those commonly employed in aircraft. Consequently, the components of the rotor 100 are typically manufactured from high-strength materials. For example, the poles 120a–d can be formed from steel, while the shaft 110 and the spokes 130a–d can be formed from steel, titanium or high-strength aluminum. It will be appreciated, however, that these materials are only exemplary of a preferred embodiment and that other suitable materials can be employed.

Figure 2:
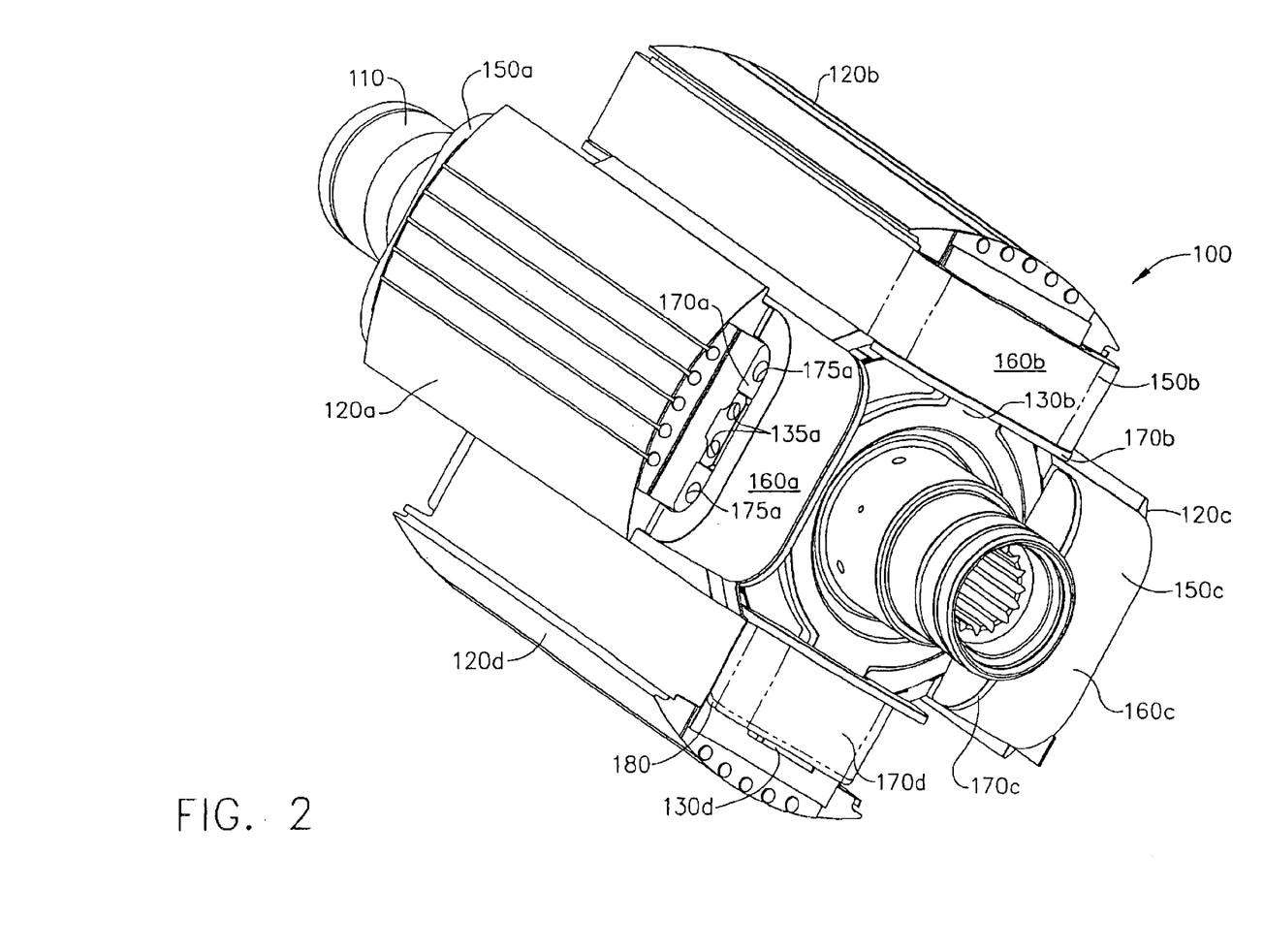
FIG. 2 is a perspective view of the rotor of FIG. 1 on which have been placed additional components, including supports for end turns of wires of coils of the rotor in accordance with one embodiment of the present invention.

Turning to FIG. 2, the rotor 100 of FIG. 1 is shown with additional components. In particular, the rotor 100 further includes wire coils 150a–c that are wrapped around respective poles 120a–c. The wire coils 150a–c typically are made up of hundreds of individual wire loopings around the respective poles 120a–c. As shown, the wire coils 150a–c loop around the respective spokes 130a–c as they loop around the poles 120a–c. The portions of the wire coils 150a–c that loop around the spokes 130a–c are referred to as the end turns 160a–c of the wire coils. A fourth wire coil 150d having end turns 160d is not shown in FIG. 2, although such a coil would be wrapped around the pole 120d in a completely-assembled rotor.

In order to provide proper support, alignment and retention of the end turns 160a–d as they curve around the spokes 130a–d, supports 170a–d are provided that overlay the respective spokes 130a–d and provide support for the end turns 160a–d. The end turns 160d are not shown in FIG. 2 in order to provide a clearer view of the support 170d. As shown, the support 170d surrounds the corresponding spoke 130d on three of its sides. The support 170d has an outer edge 180 that forms a contiguous extension of one of the sides of the pole 120d and curves around the spoke 130d until it reaches and contiguously joins the opposite side of the pole. Similar to the spokes 130a–d, each of the supports 170a–d includes one or more threaded holes 175a–d (only holes 175a are shown), which are discussed further below.

Figure 3:
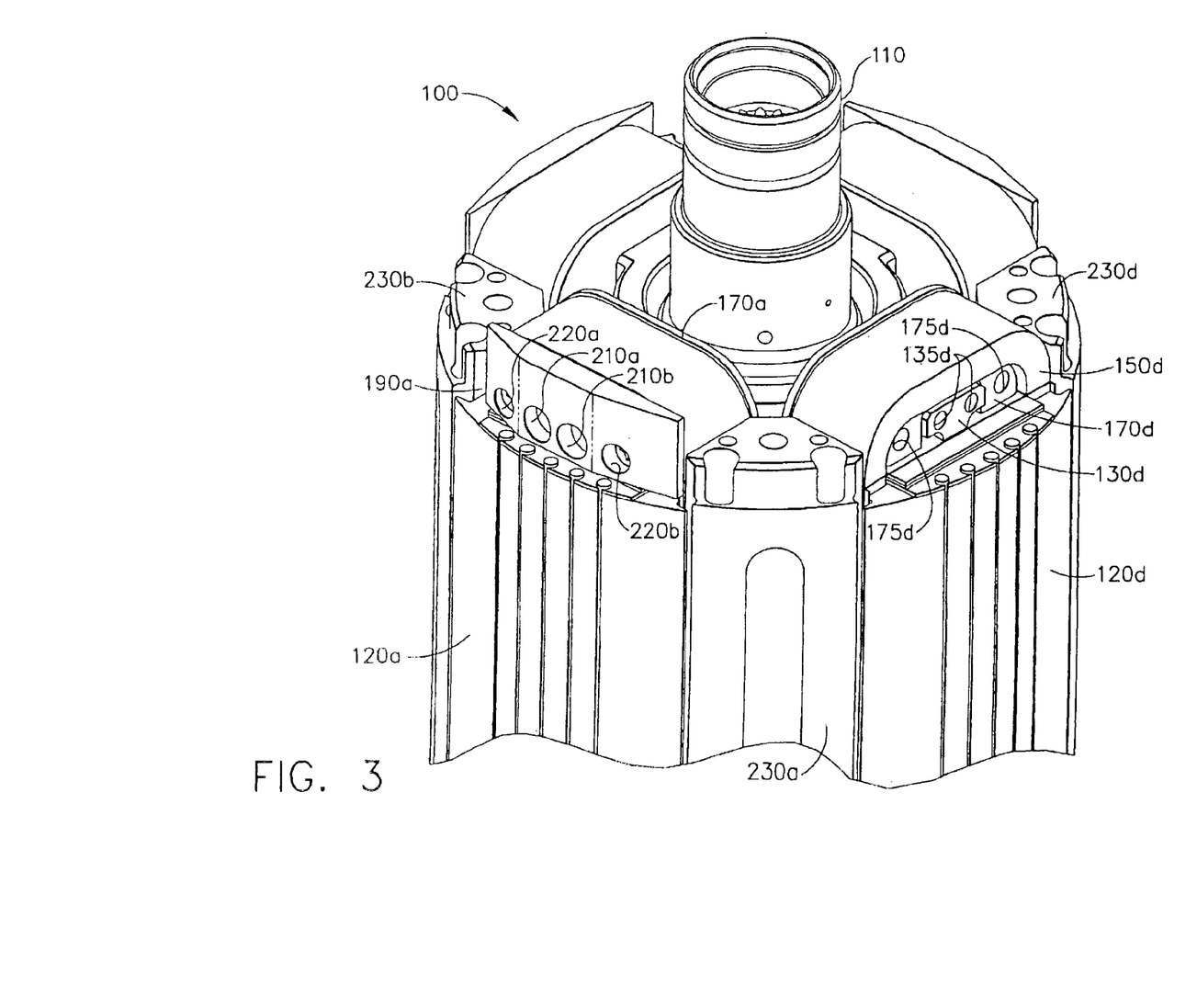
FIG. 3 is a perspective view of an end portion the rotor of FIGS. 1 and 2, in which still additional components have been added.

Referring to FIG. 3, an end portion of the rotor 100 of FIGS. 1 and 2 is shown with several additional components included. In particular, end turns 160d of a fourth wire coil 150d are now shown to be wrapped around the support 170d, which is positioned about the fourth spoke 130d. Thus, each of the poles 120a–d now includes its respective wire coil 150*a*–*d* and in particular includes its respective end turns 160*a*–*d* wrapped around its respective support 170*a*–*d* and thus around its respective spoke 130*a*–*d*.

In addition, the rotor 100 of FIG. 3 includes an end cap hat 190*a* associated with the pole 120*a*. As shown, the end cap hat 190*a* is a flange or wall having a trapezoidal cross section, and can be made of the same high-strength material as the spokes 130*a*–*d* (e.g., high-strength aluminum). It is termed an end cap hat because it also interfaces with an end cap (not shown), which is placed over the entire end of the rotor 100 upon completion of its assembly. In alternate embodiments, the end cap hat need not directly interface with an end cap, and can be a flange or wall of any one of a variety of shapes. As shown, the end cap hat 190*a* includes a first set of bolt holes 210*a,b* and a second set of bolt holes 220*a,b*. The first set of bolt holes 210*a,b* are configured to receive bolts (see FIG. 5) to secure the end cap hat 190*a* to the spoke 130*a* (see FIG. 2). The second set of bolt holes 220*a,b* are configured to receive bolts (see FIG. 4) that secure the support 170*a* and the end cap hat 190*a* together. As noted above, both the spoke 130*a* and the support 170*a* have corresponding threaded holes 135*a* and 175*a*, respectively. These corresponding holes 135*a* and 175*a* are configured to receive the first set of bolts 210*a,b* and the second set of bolts 220*a,b*, respectively. As a result, the end cap hat 190 is coupled both to the spoke 130*a* and the support 170*a*. Correspondingly, each of the other spokes 130*b*–*d* and supports 170*b*–*d* can be coupled in similar fashion to corresponding end cap hats (not shown).

The end cap hat 190*a* and other end cap hats corresponding to the other poles 120*b*–*d* serve the purpose of preventing movement of the wires of the coils 150*a*–*d* during rotation of the rotor 100. This in turn helps to protect the rotor coil wires from damage due to bending and mechanical stress during high speed operation of the rotor 100, maximizes the bending critical speed of the rotor, and helps to maintain the overall balance of the motor. As shown, once the coils 150*a*–*d* are wrapped onto the poles 120*a*–*d*, filler elements or wedges 230*a*–*d* (wedge 230*c* not being shown due to the presence of the shaft 110) are added in order to provide additional support to the windings of the coils 150*a*–*d* and for other purposes (e.g., to reduce the effects of air resistance upon the rotation of the rotor 100 during operation).

Figure 4:
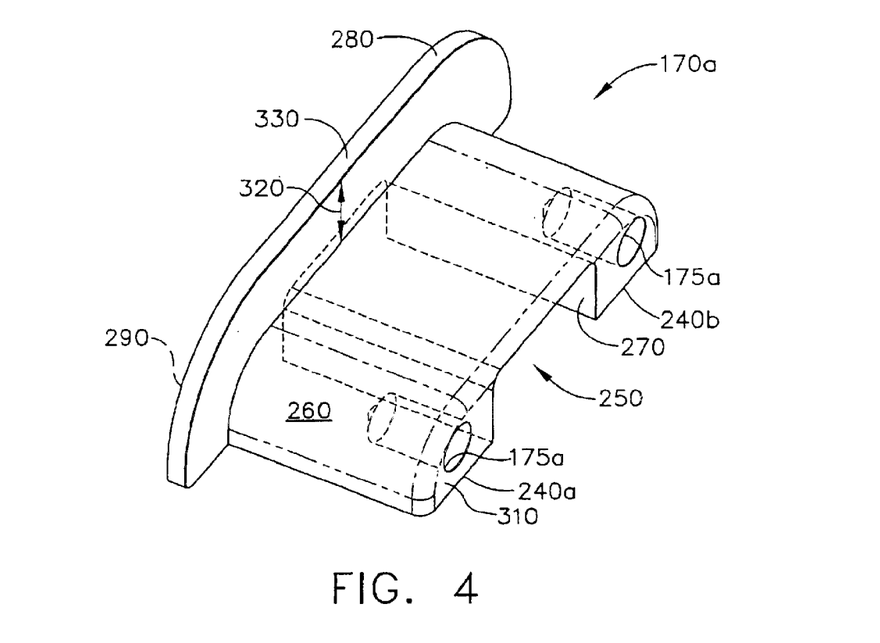
FIG. 4 is a perspective view of one of the supports employed in the rotor shown in FIGS. 2 and 3.

Referring to FIG. 4, a perspective view of the support 170*a* of FIGS. 2 and 3 is provided to show additional detail of the support. In accordance with a preferred embodiment of the invention, the support 170*a* is an approximately u-shaped component (actually u-shaped when viewed upside down) with first and second ends 240*a*, 240*b* that are configured to rest upon the pole 120*a* of the rotor 100 when the support is installed. The ends 240*a*, 240*b* are on opposite sides of a channel 250, through which is positioned the spoke 130*a* when the support 170*a* is installed onto the rotor 100.

Further as shown, the support 170*a* has an outer perimeter or face 260 and an inner perimeter or face 270. The outer face 260 is, at the ends 240*a* and 240*b*, contiguous with the pole 120*a* when the support 170*a* is installed. The outer face 260, in between the ends 240*a* and 240*b*, is a generally u-shaped, smoothly-transitioning surface around the outside of the support 170*a* across which the wires of the coil 150*a* can be wrapped. The inner face 270 also is a generally u-shaped surface that proceeds from end 240*a* to end 240*b*. In general, the inner face 270 is configured to physically contact the spoke 130*a* when the support 170*a* is installed on the rotor 100. In alternate embodiments, neither the spoke 130*a* nor the inner face 270 need have a general u-shape, and also the amount of physical contact between the support and the spoke when the support is installed can vary. Generally, however, the channel 250 of the support 170*a* is designed to be in contact with the spoke 130*a* so that the spoke limits movement of the support, at least with respect to directions that are transverse both to the spoke and the shaft 110.

In accordance with the preferred embodiment of the invention, the support 170*a* includes a lip or flange 280 at or proximate to a first side 290 that is opposite a second side 310. The second side 310 abuts the end cap hat 190*a* when the support 170*a* and the end cap hat 190*a* are installed on the rotor 100 (see FIG. 5). The flange 280 extends beyond the outer face 260 by a distance 320, which typically will be a distance equaling or greater than the thickness of the coil 150*a* when it is wrapped around the support 170*a*. In the present embodiment, the flange 280 extends beyond the outer face 260 in all directions around the outer face. That is, an outer edge 330 of the flange 280 also takes on a general u-shape. Thus, when the support 170*a* is installed on the rotor 100 over the spoke 130*a*, the flange 280 can be said to extend outward away from the spoke. In alternate embodiments, the flange 280 need not extend beyond the outer face 260 continuously in all directions, but need only extend beyond the outer face 260 at one or more distinct regions (that is, the outer edge 330 need not have a continuous u-shape).

Figure 5:
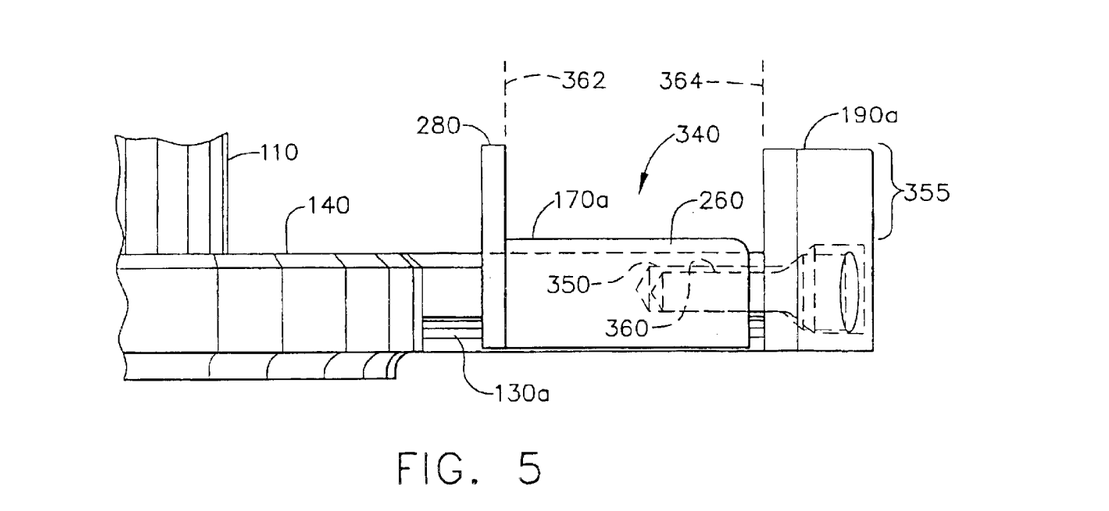
FIG. 5 is an elevation view, shown in cut-away, of a shaft and a spoke of the rotor of FIGS. 1–3, along with one of the supports shown in FIGS. 2–4 and an end cap hat.

Turning to FIG. 5, an elevation view is provided (shown in cut away) of the shaft (including the hub 140), the spoke 130*a*, the support 170*a*, and the end cap hat 190*a* when the support 170*a* and the end cap hat 190*a* are installed onto the spoke 130*a*. Both the flange 280 and an outward protrusion portion 355 of the end cap hat 190*a* extend outward away from the spoke 130*a* beyond the outer face 260 of the support 170*a*. Consequently, a trench 340 is created in between the flange 280 and the end cap hat 190*a*. It is within the trench 340 that the end turns 160*a* of the coil 150*a* can be wrapped, and it is due to the outward protrusion 355 of the end cap hat 190*a* and the outer face 260 and the flange 280 of the support 170*a* that the end turns are prevented from moving during rotation of the rotor 100.

It is particularly due to the structure of the support 170*a*, including the flange 280, that the end turns 160*a* are retained strongly within the trench 340. As shown, inner bolts 350 fit within bolt holes 210*a,b* of the end cap hat 190*a* and corresponding holes 135*a* of the spoke 130*a* (see FIG. 3), and are used to affix the end cap hat 190*a* to the spoke 130*a*. Further, outer bolts 360 fit within bolt holes 220*a,b* (see FIG. 3) and corresponding bolt holes 175*a* (see FIG. 4), and are employed to affix the support 170*a* to the end cap hat 190*a*, thereby locking the support 170*a* also with respect to the spoke 130*a*.

Given that the support 170*a* includes the flange 280, this configuration allows for pressure to be applied in a predictable manner to the windings of the coil 150*a* and for more precise positioning of the wire windings. Typically, the process for assembling a coil (such as the coil 150*a*) on the rotor 100 includes (a) positioning the support 170*a* onto the spoke 130*a*, (b) wrapping the wire windings of the coil 150*a* onto the pole 120*a*, including the support, (c) affixing the end cap hat 190*a* to the spoke 130*a* using the inner bolts 350, and then (d) affixing the support 170*a* to the end cap hat 190*a* by tightening the outer bolts 360. Thus, after the wires are wrapped onto the pole 120*a*, they are forced into a precisely determined position between inner and outer limits 362 and 364, respectively, through the tightening of the support 170*a* against the end cap hat 190*a*, and pressure is also created among the wires within the trench 340 between the flange 280 and the outward protrusion 355 of the end cap hat 190a. In particular, sufficient pressure is created to take all (or almost all) slack out of the coil 150a. In certain embodiments, the appropriate amount of tightening of the support 170a against the end cap hat 190a (sufficient to take the slack out of the coil 150a) can be provided by tightening up the bolts 360 to their design torque.

Figure 6:
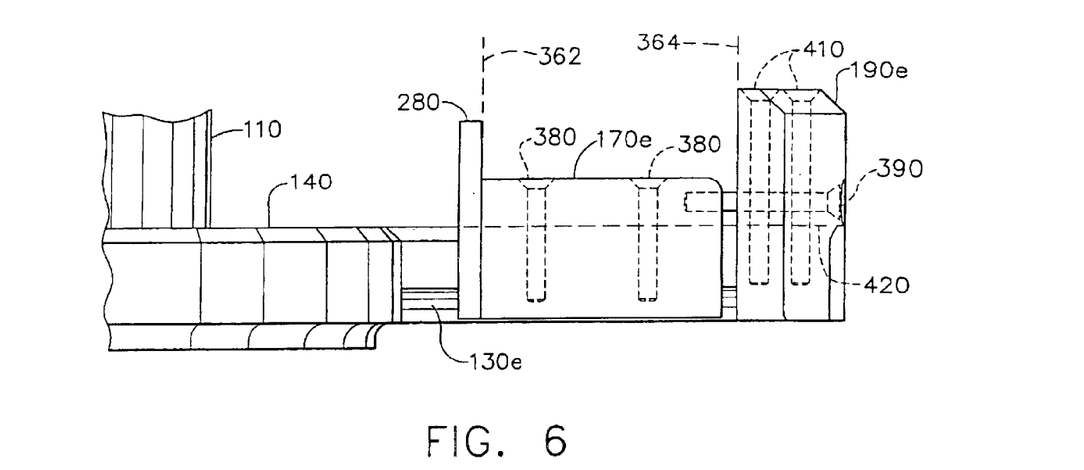
FIGS. 6 and 7 are elevation views, shown in cut-away, of various embodiments of shafts and spokes of the rotor of FIGS. 1–3, in combination with alternate embodiments of supports and other structures employed to support and retain end turns of wire coil windings.
Figure 7:
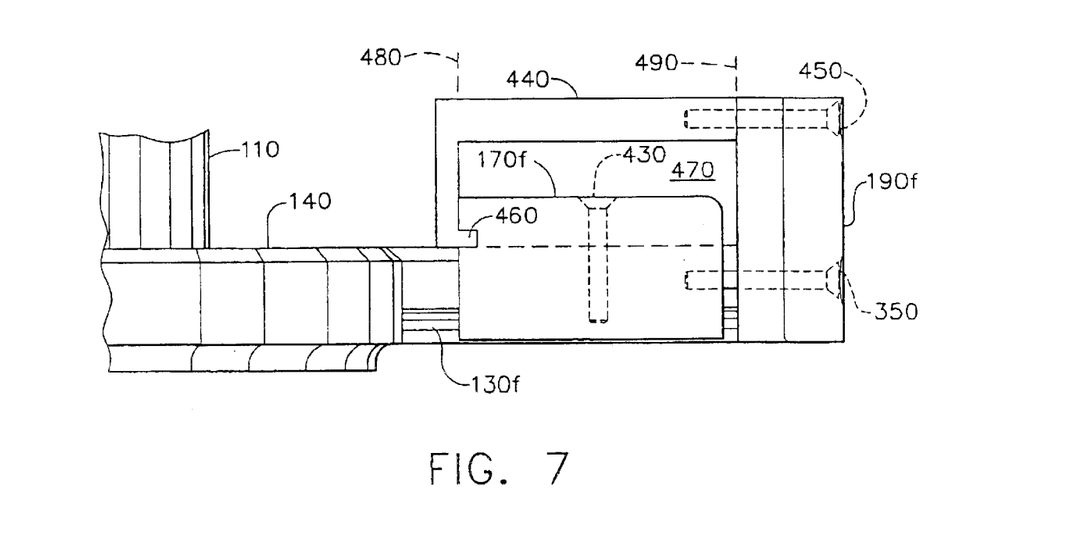

Referring to FIGS. 6 and 7, a variety of alternate embodiments of structures for supporting and retaining the end turns of the coils can also be employed on the rotor 100. For example, in FIG. 6, two alternate embodiments are shown in which a support 170e is directly coupled to a spoke 130e by way of bolts 380. The support 170e otherwise has the same features as the support 170a, including the flange 280. In order to properly position and affix an end cap hat 190e with respect to the spoke 130e and the support 170e, either bolts 390 can be used to affix the end cap hat directly to the support, or bolts 410 can be employed to affix the end cap hat directly to the spoke. In the latter embodiment, the spoke 130e should be extended to fit through a channel 420 through the end cap hat 190e so that the bolts 410 can be attached to the spoke. This latter embodiment in which both the support 170e and the end cap hat 190e are both affixed directly to the spoke 130e is less desirable than the other embodiment insofar as no pressure is directly created between the support and the end cap hat.

With respect to FIG. 7, another embodiment is provided in which a support 170f no longer includes the flange 280. Instead, when the support 170f is installed on a spoke 130f by way of a bolt 430, an end cap hat 190f is affixed to the spoke and further a L-type bracket 440 is then affixed to the end cap hat so that the bracket 440 passes above the support and then curves downward to be secured relative to the spoke. The bracket 440 can be attached to the end cap hat 190f by way of a bolt 450. Depending upon the embodiment, the bracket 440 can be secured relative to the spoke 130f in any of a number of ways, including by way of bolts or, as shown, by including a toe 460 that fits inside a corresponding recess within the support 170f. Using the embodiment of FIG. 7, the wire windings of the coil supported by the support 170f pass within a region 470 between the bracket 440 and the support 170f. Due to the force applied by the bolt 450 coupling the bracket 440 to the end cap hat 190f, pressure again is created among the windings of the coil and the end turns of the coil further are restrained from movement towards or away from the shaft 110 beyond inner and outer limits 480, 490 created by the bracket 440 and the end cap hat 190f. Because the bracket 440 surrounds the coil and the opposite side of the support 170f, in this embodiment, the bracket 440 should be capable of easily conducting (or removing) heat being dissipated by the wire windings.

Figure 8:
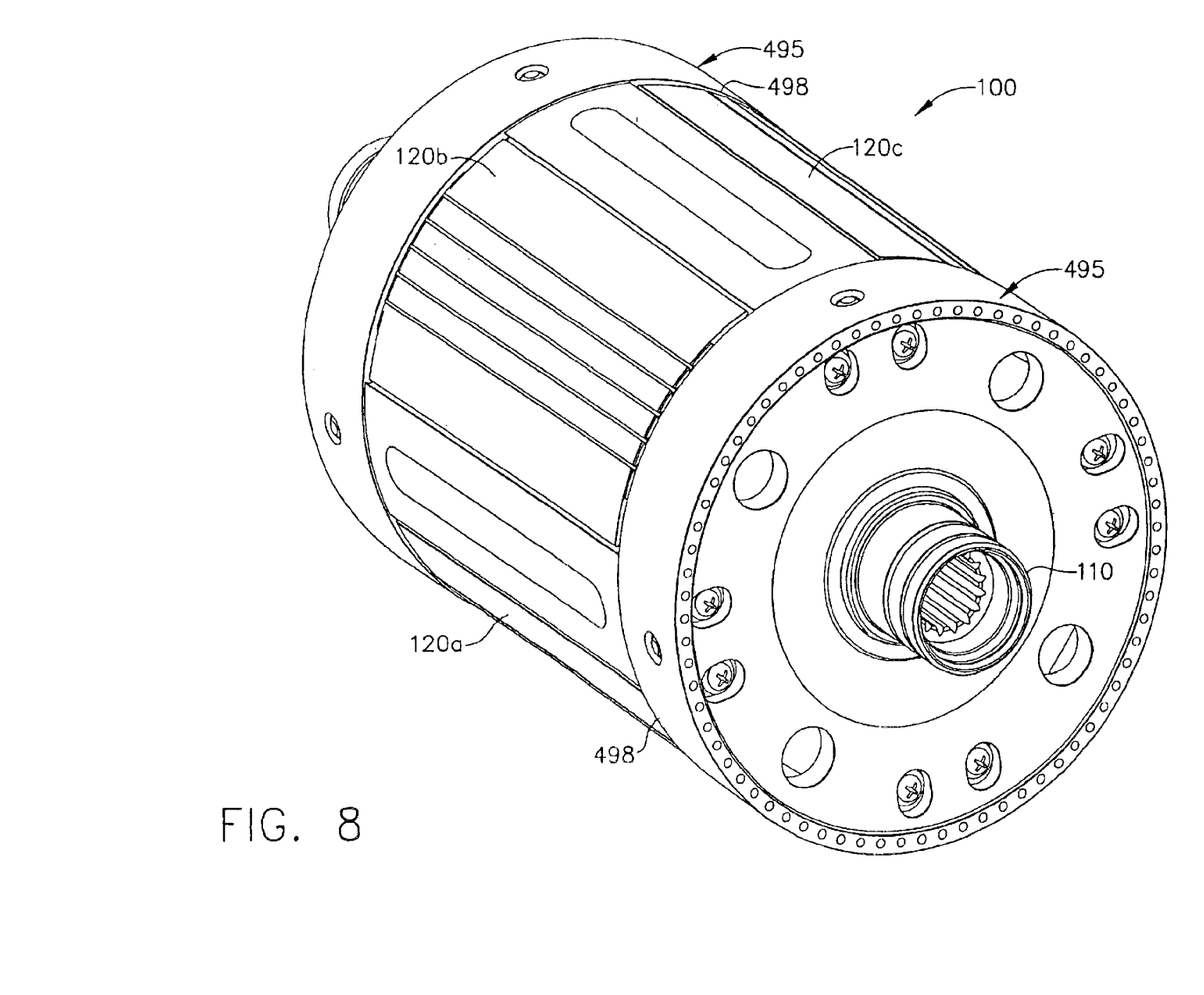
FIG. 8 is a perspective view of the rotor of FIGS. 1–3 in its completely-assembled form.

Referring to FIG. 8, the rotor 100 is shown in a completely-assembled form. In particular, the rotor 100 includes, in addition to the poles 120a–c (pole 120d being hidden from view) and the shaft 110, end caps 495 at either end of the rotor. Lips 498 of the end caps 495 extend over and around the end cap hats 190a–d discussed above.

Figure 9:
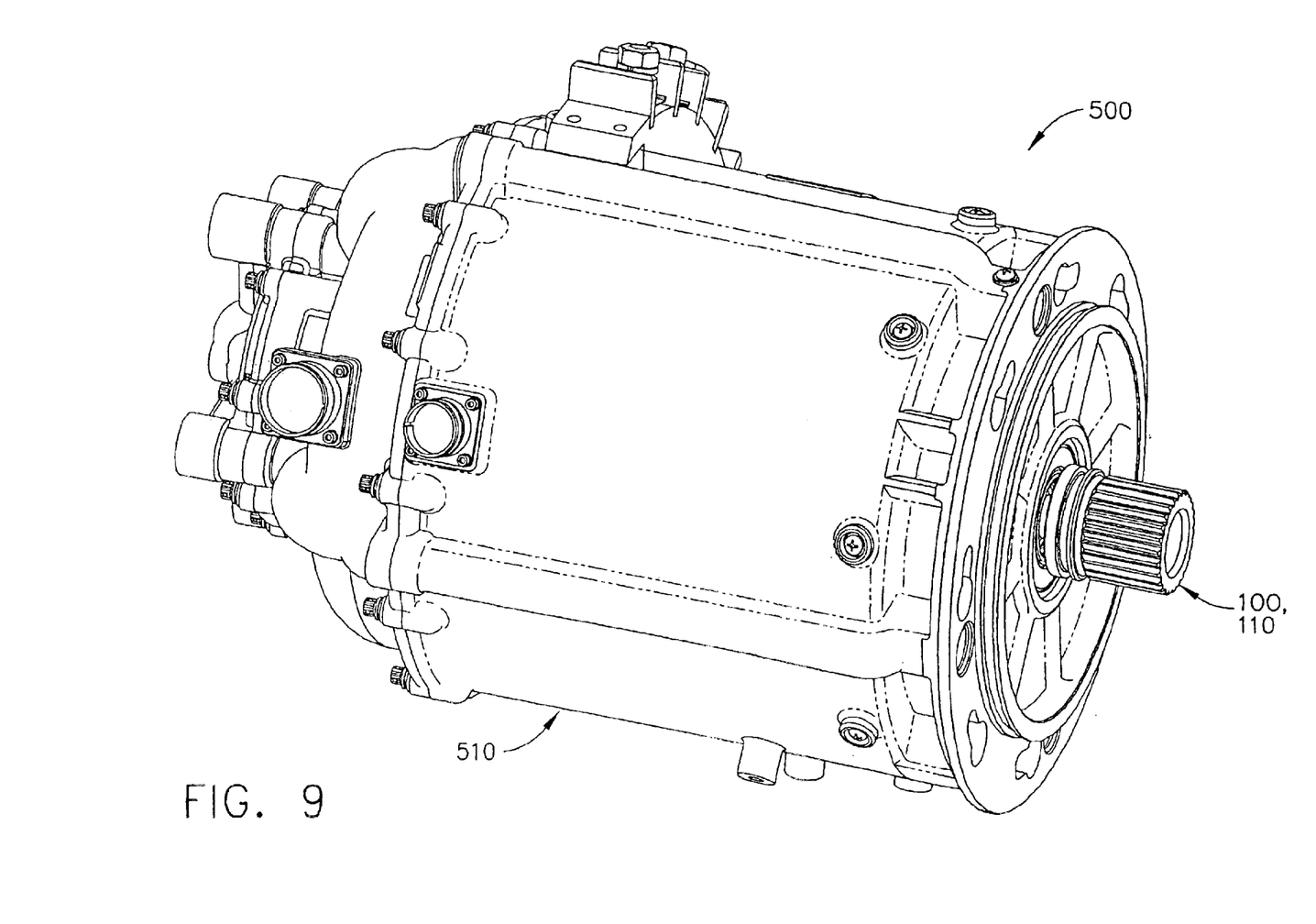
FIG. 9 is a perspective view of a generator in which the embodiments of the rotor and rotor components shown in FIGS. 1–8 can be employed.

Further referring to FIG. 9, the rotor 100 (including the shaft 110) is shown incorporated within a complete generator 500 that also includes a stator 510 surrounding the rotor 100. The rotor 100 employed within the generator 500 can employ any of the structures discussed above for supporting and retaining the wires of the coils of the rotor, as well as other embodiments of such structures. In addition, rotors similar to rotor 100 with structures similar to those discussed above for supporting and retaining coils can be employed within the generator 500, including rotors having fewer or more poles than the four poles 120a–d shown in FIGS. 1–3 (e.g., six poles). Additionally, while the generator 500 shown in FIG. 8 is the main generator of a generator set (typically used on airplanes) that includes additionally an exciter and a permanent magnet generator (PMG), the generator can in alternate embodiments be an exciter or a PMG.

In the case where the generator 500 is the main generator, the coils of the rotor 100 are provided with direct current, while coils (not shown) of the stator 510 conduct alternating current during operation of the generator. However, rotors with structures for supporting and retaining coils that are similar to those discussed above can be employed in other types of machines, on which a variety of different alternating currents and direct currents are employed on the rotor. In particular, such machines can include other types of synchronous, induction-type and DC-type generators and motors.

Also, in alternate embodiments, the spokes and poles emanating radially away from the shaft of the rotor can take a variety of different forms such that the manner in which the supports and/or end cap hats are secured at specific radial positions away from the central shaft can vary. For example, appendages coupling the supports and end cap hats to the shaft can take a form other than the spokes 130. Further, the manner in which the supports and end cap hats are coupled to one another and to the spokes or appendages can vary from the use of bolts as shown. For example, in alternate embodiments, other fastening devices known in the art including glue or welding can be employed. Additionally, the supports and end cap hats can take a variety of different shapes, only some of which are described herein. For example, the individual end cap hats 190a–d used with respect to spokes 130a–d, respectively, can be replaced with a simple end cap hat ring that extends around the entire circumference of the rotor and caps the ends of all of the spokes of the rotor. Further, end cap hats that cap the ends of more than one spoke but not all of the spokes (e.g., two spokes) can also be employed.

Thus, while the invention has been described with reference to a preferred embodiment, it will be understood by those skilled in the art that various changes may be made and equivalents may be substituted for elements thereof without departing from the scope of the invention. In addition, many modifications may be made to adapt the teachings of the invention to a particular situation without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An assembly for implementation on a spoke extending outward radially from a shaft of a rotor, the assembly comprising:

a support configured to be positioned on the spoke, the support including:

a U-shaped main portion having an outer face and an inner face, wherein the support is configured so that the inner face of the support is in physical contact with the spoke when the support is supported thereby, and wherein the support is further configured to support a wire coil that is wrapped around the support along the outer face, first and second sides of the U-shaped main portion that are substantially transverse with respect to the outer and inner faces and also with respect to a channel along the loner face through the U-shaped main portion, the channel being configured to receive the spoke, and a flange proximate the first side of the U-shaped main portion and extending outward away from the channel beyond the outer face, wherein the support is configured to be positioned on the spoke so that the first side is closer to the shall than the second side and an end cap coupled to the support, the end cap including:
a physical barrier,
a first fastening element by which the end cap is coupled to the spoke, and
a second fastening element by which the end cap is coupled to the support.

2. A support for implementation on a spoke extending outward radially from a shall of a rotor, the support comprising:

a U-shaped main portion having an outer face and an inner face, wherein the support is configured so that the inner face of the support is in physical contact with the spoke when the support is supported thereby, and wherein the support is further configured to support a wire coil that is wrapped around the support along the outer face;

first and second sides of the U-shaped main portion that are substantially transverse with respect to the outer and inner faces and also with respect to a channel along the inner face through the U-shaped main portion, the channel being configured to receive the spoke; and a flange proximate the first side of the U-shaped main portion end extending outward away from the channel beyond the outer face;

wherein the support is configured to be positioned on the spoke so that the first side is closer to the shaft than the second side; and wherein the support is configured to allow for coupling of the support to a cap hat.

3. An end cap device for implementation in a rotor, wherein the rotor includes an appendage extending outward radially from a shaft of the rotor and further includes a support positioned on the appendage, wherein the support is capable of supporting end turns of a wire coil of the rotor and includes a flange at an inner radial position that limits movement of the end turns radially inward toward the shaft, the end cap device comprising:

a physical barrier that does not form part of the support, the physical barrier including at least a first fastener opening and a second fastener opening extending therethrough;

a first fastener configured to extend through the first fastener opening and couple the end cap device to the appendage; and a second fastener configured to extend through the second fastener opening and couple the end cap device to the support.

* * * * *